US007613364B2

(12) United States Patent
Kang et al.

(10) Patent No.: US 7,613,364 B2
(45) Date of Patent: Nov. 3, 2009

(54) GLOBAL MOTION-COMPENSATED SEQUENTIAL-SCANNING METHOD CONSIDERING HORIZONTAL AND VERTICAL PATTERNS

(75) Inventors: Moon-Gi Kang, Goyang-si (KR); Min-Kyu Park, Seoul (KR); Min Byun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 590 days.

(21) Appl. No.: 11/039,755

(22) Filed: Jan. 19, 2005

(65) Prior Publication Data

US 2005/0201626 A1 Sep. 15, 2005

(30) Foreign Application Priority Data

Jan. 20, 2004 (KR) .................... 10-2004-0004110

(51) Int. Cl.
- G06K 9/32 (2006.01)
- G06K 9/36 (2006.01)
- G06K 9/46 (2006.01)
- H04N 7/01 (2006.01)
- H04N 11/20 (2006.01)

(52) U.S. Cl. .................. 382/300; 382/236; 348/448; 348/452

(58) Field of Classification Search .......... 382/166, 382/236, 300; 348/448, 452; 358/525; 375/240.16
See application file for complete search history.

(56) References Cited

U.S. PATENT DOCUMENTS

| | | | | | |
|---|---|---|---|---|---|
| 5,132,795 | A | * | 7/1992 | Campbell | 348/447 |
| 5,619,272 | A | * | 4/1997 | Salmon et al. | 348/452 |
| 5,661,525 | A | * | 8/1997 | Kovacevic et al. | 348/452 |
| 6,288,745 | B1 | * | 9/2001 | Okuno et al. | 348/448 |
| 6,331,874 | B1 | | 12/2001 | de Garrido | 348/452 |
| 6,385,245 | B1 | * | 5/2002 | De Haan et al. | 375/240.16 |
| 7,187,792 | B2 | * | 3/2007 | Fu et al. | 382/128 |
| 7,321,396 | B2 | * | 1/2008 | Jung et al. | 348/452 |
| 7,362,376 | B2 | * | 4/2008 | Winger et al. | 348/448 |
| 2002/0171759 | A1 | | 11/2002 | Handjojo | 348/452 |
| 2003/0086499 | A1 | * | 5/2003 | Lunter et al. | 375/240.16 |
| 2005/0122426 | A1 | * | 6/2005 | Winger et al. | 348/452 |

FOREIGN PATENT DOCUMENTS

| | | |
|---|---|---|
| KR | 2001-0011560 | 2/2001 |
| KR | 2001-0069083 | 7/2001 |
| WO | WO 01/78389 | 10/2001 |
| WO | WO 03/039147 | 5/2003 |

OTHER PUBLICATIONS

Bellers et al. ("Majority-Selection De-Interlacing," Proceedings of SPIE, vol. 3974, 2000, pp. 386-395).*
De Haan et al. ("Deinterlacing—An Overview," Proceedings of IEEE, vol. 86, No. 9, Sep. 1998, pp. 1839-1857).*
Kwon et al. ("A Motion-Adaptive De-Interlacing Method," IEEE Trans. Consumer Electronics, vol. 38, Issue 3, Aug. 1992, pp. 145-150.*

* cited by examiner

*Primary Examiner*—Yubin Hung
(74) *Attorney, Agent, or Firm*—F. Chau & Associates, LLC

(57) ABSTRACT

A sequential-scanning process with motion information that compensates for inadequate motion estimation and motion compensation that would otherwise cause degradation of images, by correctly detecting errors arising from operations of motion estimation and compensation. Horizontal and vertical (filtered) patterns of each of motion-compensated (MC) and spatial-interpolated (SI) images are compared. If there is an error in the procedure of motion estimation, the process is carried out with a mixed (weighted) combination of the motion compensation and spatial interpolation or with the spatial interpolation only, instead of the motion compensation.

21 Claims, 4 Drawing Sheets global motion vector $\Delta h$ = MED$\{\Delta h_1, \Delta h_2, \cdots, \Delta h_N\}$
global motion vector $\Delta v$ = MED$\{\Delta v_1, \Delta v_2, \cdots, \Delta v_N\}$

- ⊛ t-1 Field : Distance from pixel to be interpolated(h1, v1)
- ◐ t   Field : Distance from pixel to be interpolated(h2, v2)
- ◯ t+1 Field : Distance from pixel to be interpolated(h3, v3)

Fig. 6A
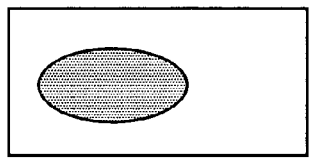
Fig. 6B
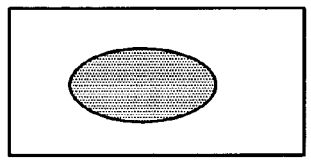
Fig. 6C
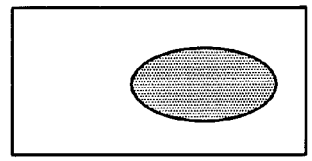
Fig. 6D
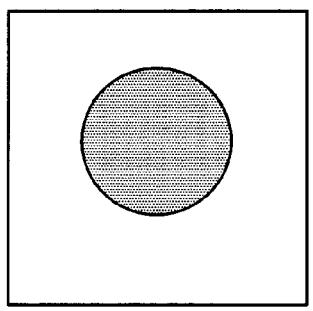
Fig. 6E
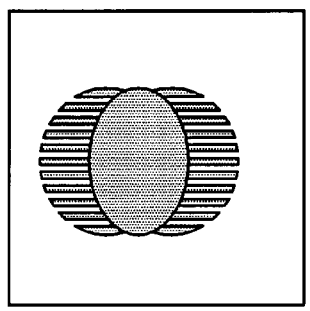
Fig. 6F
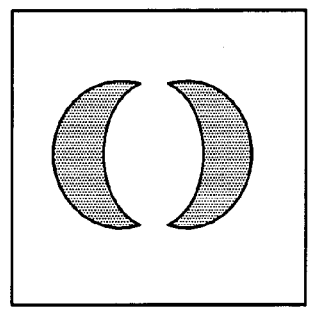
Fig. 7A
| 1 | 1 | 1 |
|---|---|---|
| 0 | 0 | 0 |
| -1 | -1 | -1 |
Fig. 7B
| -1 | 0 | 1 |
|---|---|---|
| -1 | 0 | 1 |
| -1 | 0 | 1 |

GLOBAL MOTION-COMPENSATED SEQUENTIAL-SCANNING METHOD CONSIDERING HORIZONTAL AND VERTICAL PATTERNS

CROSS-REFERENCE TO RELATED APPLICATIONS

This U.S. non-provisional patent application claims priority under 35 U.S.C. § 119 of Korean Patent Application 2004-04110 filed on Jan. 20, 2004, the entire contents of which are hereby incorporated by reference.

FIELD OF THE INVENTION

The present invention relates to processing video signals, and more particularly to a method of sequential (or progressive) scanning, and of interpolating current blocks therein.

DISCUSSION OF RELATED ART

Recent developments in consumer electronics, such as high definition television sets, multimedia, and personal computers require transforming images between various image formats. Of increasingly importance is a sequential scanning process, that derives a sequentially scanned image from an interlaced scanned image, which has been used for saving memory and communication bandwidth. Especially, with ever increasing demand for high quality images and multimedia products, there is a need for an advanced technique for sequentially scanning that is able to generate high quality images, with an implementing algorithm having high stability and performance.

Typical sequential scanning algorithms are usually classified into intra-field interpolation using only one field, inter-field interpolation using data of two fields, and hybrid interpolation. The intra-field interpolation using one field includes a simple linear interpolation method, a method using a median filter with a weight value and a mixed type of a median filter and a low-pass filter (NMF/MAF; nested median filter/median averaging filter), and an edge-dependent interpolation (EDI) method. In particular, the EDI algorithm efficient in conserving an edge is advantageous in enhancing visible performance. Such intra-field interpolation methods or algorithms have a benefit of reducing calculation burdens relative to the methods using plural fields. However, since those methods operate with limited image information, it is impossible to completely restore high frequency components in the original image data.

The method using plural fields is divided into types of motion-adaptive filtering (MAF) and motion compensation (MC). The MAF method first detects a motion and differentiates between where a motion is present and where a motion is absent. Next, the MAF method adopts an algorithm of a space-domain filter, a time-domain filter, or a time/space-domain filter respective to the two cases (motion presence and motion absence). Otherwise, the MC finds a motion and then filters data along a direction of the motion in a time dimension. In a sequential scanning process with motion information, an unstable process in motion estimation causes image quality to be worse relative to a process without motion information, putting a burden on hardware.

In global motion compensation (GMC), the motion model basically reflects camera motions such as dolly (forward, backwards), track (left, right), boom (up, down), pan (left, right), tilt (up, down) and roll (along the view axis). In block motion compensation (BMC), the frames are partitioned in blocks of pixels (e.g. macroblocks of 16×16 pixels in MPEG). Each block is predicted from a block of equal size in the reference frame. The blocks are not transformed in any way apart from being shifted to the position of the predicted block. This shift is represented by a motion vector.

In general, it is difficult to perform accurate motion estimation (ME) when an object appears or disappears from view, or when the size of an object varies (e.g., by zooming-in or out). Further, the ME may be insufficient to display good performance when plural motions simultaneously occur in a block matching algorithm (BMA) mode, when other noises are generated, or when results of motion estimation with sub-pixel precision are different from each other by motion estimators. In order to accomplish a high-performance sequential scanning process, it is necessary to carry out accurate motion estimation. But, when the accurate motion estimation cannot be easily obtained, a correct part of an incomplete motion estimation is used and then compensated for a motion by means of another method.

SUMMARY OF THE INVENTION

The present invention is directed to a high performance sequential scanning method capable of reliably detecting errors arising from motion estimation or motion compensation in a video image sequence.

An embodiment of the invention provides a hybrid sequential-scanning algorithm based on EDI (edge-dependent interpolation) and GMC (global motion compensation) unaffected by inaccurate motion estimation and the insufficiency of image information in a frame. The motion estimation is conducted only with a previous motion in order to reduce hardware burden. During this, it uses motion information with sub-pixel precision in order to obtain a correct high-frequency component, and any error due to incorrect motion information is precisely sorted by patterns of vertical/horizontal high-frequency components. Incorrect motion information makes a vertical high frequency of GMC increase more than that of EDI, without increasing a horizontal frequency of GMC. A threshold value associated such properties is established with maintaining information input from plural fields, as well as correctly sorting errors due to incorrect motion information.

An embodiment of the invention provides a method of sequentially scanning image data, comprising the steps of: performing a spatial interpolation; performing a motion compensation (with integer pixel resolution); comparing the vertical high-frequency energy of the result of motion compensation with the vertical high-frequency energy of the result of spatial interpolation. The method may further comprise the conditional step of selecting a result of the spatial interpolation as an interpolated value of a current field if vertical high-frequency energy of the motion compensation is higher than that of the spatial interpolation.

In this embodiment, the step of selecting may comprise: selecting the result of the spatial interpolation as an interpolated value of a current pixel if the vertical high-frequency energy of the result of motion compensation is higher than the vertical high-frequency energy of the result of spatial interpolation. In this embodiment, the step of comparing may comprise: calculating a weighted difference value from horizontal differential values and a vertical differential values for each of the result of motion compensation and the result of spatial interpolation; wherein each of the horizontal differential value and the vertical differential value reflects a difference between the results of the motion compensation and the spatial interpolation. If the weighted difference value is higher than a first threshold value, then selecting the result of the spatial interpolation as the interpolated value of the current pixel.

In this embodiment, the step of calculating the weight value comprises: calculating horizontal and vertical differential values for the result of the motion compensation; calculating horizontal and vertical differential values for the result of the spatial interpolation; obtaining a first number of pixels in a pixel block, in which the absolute value of the horizontal differential value for the result of the motion compensation is larger than a predetermined high-frequency critical value (a threshold value) and the absolute value of the horizontal differential value for the result of the spatial interpolation is smaller than the predetermined high-frequency threshold value; obtaining a second number of pixels in a pixel block, in which the absolute value of the vertical differential value for the result of the motion compensation is larger than the high-frequency threshold value and an absolute value of the vertical differential value for the result of the spatial interpolation is smaller than the high-frequency threshold value; and calculating the weighted difference value from the first and second numbers of pixels.

In this embodiment, the weight value includes an addition-weight value and a multiplication-weight value. In this embodiment, the difference reflecting the weight value is given by an equation being: the addition-weight value plus (the multiplication-weight value times the absolute value of the difference between the results of the motion compensation and spatial interpolation).

In this embodiment, the step of selecting comprises selecting a weighted combination of the result of the spatial interpolation and the result of the motion compensation as the value of the current interpolated pixel.

In this embodiment, the weighted combination is obtained by adding (the result of the spatial interpolation times a second weight value) plus (the result of the motion compensation multiplied by the result of subtracting the second weight value from one).

In this embodiment, the second weight value is given by an equation that is (the weighted difference value minus the second threshold value) divided by (a first threshold value–the second threshold value).

Another aspect of the invention is a method of sequentially scanning image data, comprising the steps of: performing a first motion compensation with previous and next fields; motion compensating using motion vectors the previous and next fields, to correspond with a current field; selecting an average value of the previous and next fields as the current field if the difference between the motion compensated previous and next fields is lower than a first threshold value. The said difference between the motion compensated previous and next fields may be obtained as the sum of absolute differences (SAD) between a plurality of corresponding pixels in each of the motion compensated previous and next fields. The method may further comprise performing a second motion compensation having sub-pixel precision with the previous, current, and next fields when the difference between the motion compensated previous and next fields is equal to or higher than a first threshold value.

BRIEF DESCRIPTION OF THE DRAWINGS

Preferred embodiments of the present invention will be described below in more detail with reference to the accompanying drawings. The accompanying drawings are included to provide a further understanding of the invention, and are incorporated in and constitute a part of this specification. The present invention may, however, be embodied in different forms and should not be construed as limited to the exemplary embodiments set forth herein. The drawings illustrate exemplary embodiments of the present invention and, together with the written description, serve to explain principles of the present invention. In the drawings, like numerals refer to like elements throughout the specification, and:

FIGS. 6A through 6F exemplarily illustrate the features of vertical high-frequency (VHF) energy of GMC increasing relative to VHF energy of EDI when there is an error during motion estimation and compensation; and FIGS. 7A and 7B illustrate a vertical differential filter and a horizontal differential filter, respectively.

DETAILED DESCRIPTION OF EXEMPLARY EMBODIMENTS

Figure 1:
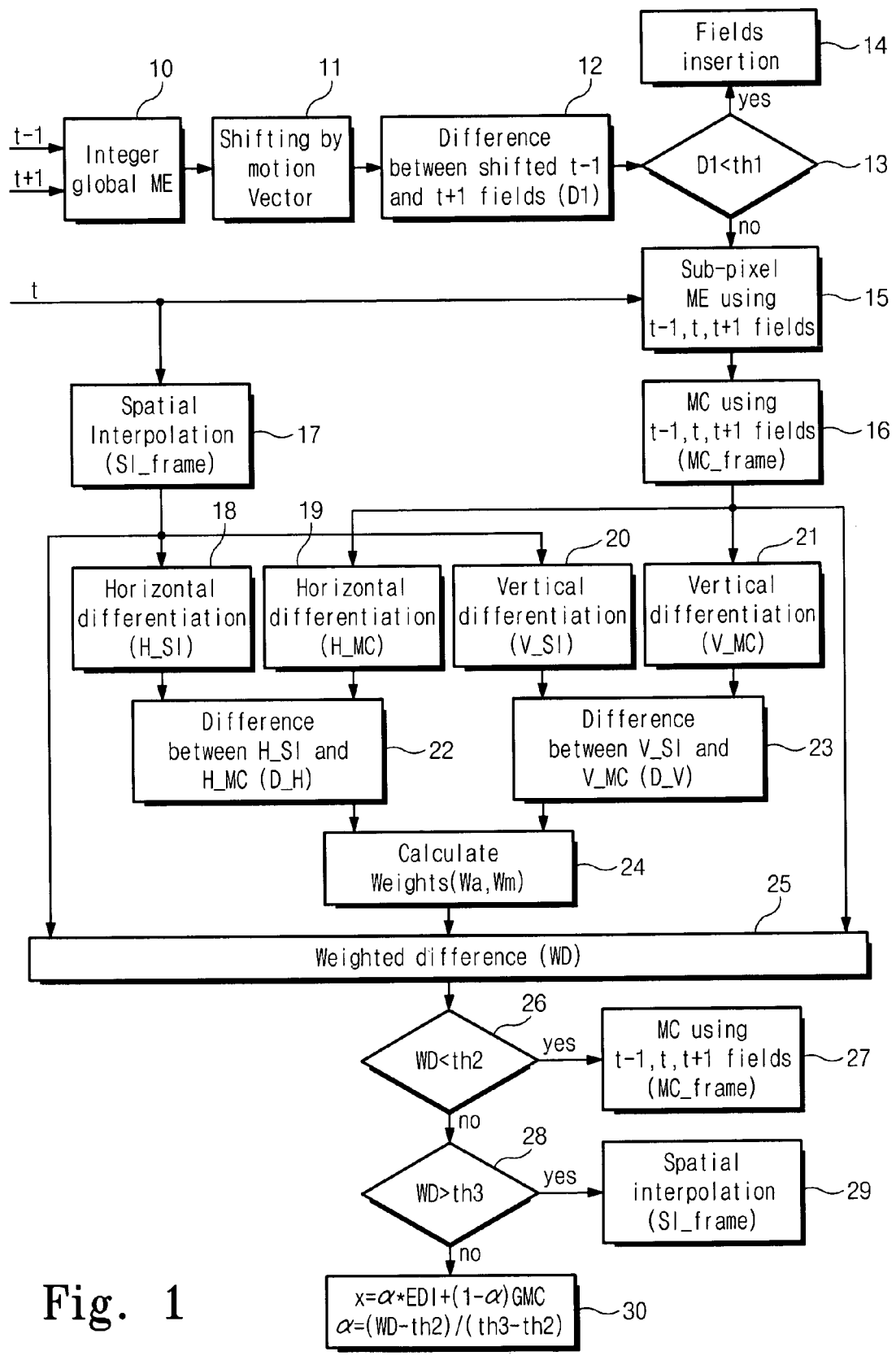
FIG. 1 is a flow chart showing a sequential-scanning algorithm in accordance with a preferred embodiment of the invention.

FIG. 1 is a flow chart showing a sequential-scanning algorithm in accordance with a preferred embodiment of the invention. An exemplary embodiment of the invention performs motion estimation with integer (whole pixel) resolution at step 10 of FIG. 1. This integer resolution motion estimation is carried out for motion variation between frames $x_1$ (having a previous field, at time t−1) and $x_3$ (having a next field, at time t+1), (shown in FIG. 3) which have similarities, by means of a block matching algorithm (BMA). The steps of FIG. 1 (10, 11, 12, 13, 14, 15, 16, 17, 18, 19, 20, 21, 22, 23, 24, 25, 26, 27, 28, 29, 30) will be explained in greater detail below, with further reference to FIGS. 2, 3, 4, 5, 6 (6A-6F), and 7 (7A & 7B).

A luminance (brightness) value of a pixel x to be interpolated on coordinates (h,v) at a given time t is denoted as x(h,v,t). In order to correctly estimate x(h,v,t) from image data of the previous field (t−1) and the next field (t+1), a spatial interpolation in step 17 employs an edge-dependent interpolation (EDI) form using higher and lower vectors of a pixel to be interpolated.

Figure 2:
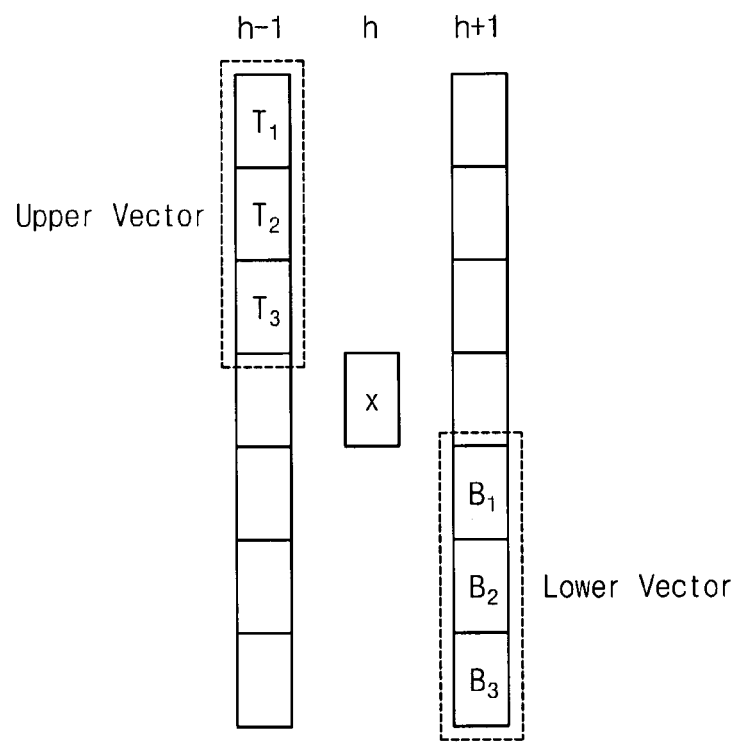
FIG. 2 illustrates the features of higher and lower vectors with size of 3.

FIG. 2 illustrates the features of higher and lower vectors having a size of 3. Referring to FIG. 2, an image data x(h,v) of a pixel x to be interpolated and belonging to a horizontal line h is interpolated from the higher and lower horizontal lines h−1 and h+1. The higher and lower vectors for interpolation to the pixel x(h,v) are defined as u(l,d) and v(m,d) respectively.

$$u(l,d) = \begin{bmatrix} x(h+d+l-1, v-1) \\ x(h+d+l, v-1) \\ x(h+d+l+1, v-1) \end{bmatrix} = \begin{bmatrix} T_1 \\ T_2 \\ T_3 \end{bmatrix} \quad \text{[Equation 1]}$$

$$v(m,d) = \begin{bmatrix} x(h-d+m-1, v+1) \\ x(h-d+m, v+1) \\ x(h-d+m+1, v+1) \end{bmatrix} = \begin{bmatrix} B_1 \\ B_2 \\ B_3 \end{bmatrix} \quad \text{[Equation 2]}$$

In the Equations 1 and 2, l and m are parameters representing a position of vector on the horizontal direction at a position of a pixel x(i,j) to be interpolated. The parameter d means a slope of an edge. $T_1$, $T_2$, and $T_3$ are brightness values of pixels in the higher vector, while $B_1$, $B_2$, and $B_3$ are brightness values of pixels in the lower vector.

An edge direction may be estimated toward a direction where a sum of difference values vary between the higher and lower vectors. However, in the case where there is noise or an edge is thin, it is hard to accomplish good performance by a sequential scanning algorithm dependent only upon a difference value between the higher and lower vectors. In this embodiment, a spatial interpolation performs a contour interpolation of an edge pattern.

The edge pattern exists along an edge direction, a horizontal direction, and a vertical direction, as aforementioned. Although this embodiment discloses a sequential scanning algorithm applied to horizontal patterns only, it may be adaptable to apply a similar sequential scanning algorithm to vertical patterns.

In order to classify horizontal patterns, image patterns are sorted based on relations of pixels within the vector. The image patterns are divided into three groups as summarized in Equation 3.

class 0 (Increase) $I_{T_1,T_2}$: $|T_1-T_2|>th$ and $T_2-T_1>0$ class 1 (Decrease) $D_{T_1,T_2}$: $|T_1-T_2|>th$ and $T_2-T_1<0$ class 0 (Flat) $F_{T_1,T_2}$: $|T_1-T_2|\geq th$ [Equation 3]

With such methods, image patterns for $T_1$ and $T_2$, $B_1$ and $B_2$, and $B_2$ and $B_3$ are differentiated. A threshold value will be described later.

From the classified higher and lower image patterns, weight values $w_1$ and $w_2$ are determined. In this embodiment, as each of the higher and lower image vectors includes three pixels, two weight values are obtained. If the higher and lower vectors each include five pixels, the number of the weight values will be 4. The methodology of obtaining the weight values may include performing an IF-THEN-ELSE (pseudo-code) program as illustrated in Equation 4.

if $((I_{T_1,T_2}$ and $I_{B_1,B_2})$ or $(D_{T_1,T_2}$ and $D_{B_1,B_2}))$ [Equation 4]

$w_1 = 1$ else if $((F_{T_1,T_2}$ and $I_{B_1,B_2})$ or $(F_{T_1,T_2}$ and $D_{B_1,B_2}))$ $w_1 = 2$ else if $((I_{T_1,T_2}$ and $I_{B_1,B_2})$ or $(D_{T_1,T_2}$ and $D_{B_1,B_2}))$ $w_1 = 2$ else if $((I_{T_1,T_2}$ and $D_{B_1,B_2})$ or $(D_{T_1,T_2}$ and $I_{B_1,B_2}))$ $w_1 = 3$ else $w_1 = 2$ Here, if patterns of the higher vector increase ($I_{T_1,T_2}$); patterns of the lower vector increase ($I_{B_1,B_2}$) or patterns of the higher vector decrease ($D_{T_1,T_2}$); and patterns of the lower vector increase ($I_{B_1,B_2}$), the weight value becomes small ($w_1=1$). Otherwise, if patterns of the higher vector increase ($I_{T_1,T_2}$); patterns of the lower vector decrease ($D_{B_1,B_2}$) or patterns of the higher vector decrease ($D_{T_1,T_2}$); and patterns of the lower vector increase ($I_{T_1,T_2}$), the weight value becomes large ($w_1=3$). Here, it is noticeable that when patterns of the higher and lower vectors are all constant or flat ($F_{T_1,T_2},F_{B_1,B_2}$) the weight value is set on an intermediate value ($w_1=2$). When an edge is thin, the weight value is set larger than a portion of an original edge direction by classifying it into 'flat (or constant) F' because pixels of the vectors have similar brightness as the background. Therefore, it is able to find out an edge direction correctly.

Similar to the methodology of Equation 4, the weight value $w_2$ can be obtained from the parameters $T_2$, $T_3$, $B_2$, and $B_3$. And, an edge direction is selected from the obtained weight values $w_1$ and $w_2$.

$$diff(d,l,m)=|u(d,l)-v(d,m)|\times w(d,l,m)$$ [Equation 5]

Where d, m, and l are given by the following Equation 6.

$-1\leq l\leq 1$ $-1\leq m\leq 1$ $-R\leq d\leq R$ [Equation 6]

Here, the range of l and m is from −1 to 1, and the range of a slope d on the edge direction is from −R to R. According to dimensions of R, an angular margin of the slope on the edge direction is determined. A pixel x(i,j) on the j'th line is interpolated with reference to the obtained $\hat{d}$, $\hat{m}$, and $\hat{l}$.

$$x(i,j) = \frac{x(h-1, v+a) + x(h-1, v+b) + x(h+1, v+c) + x(h+1, v+e)}{4}$$ [Equation 7]

Here, the parameters a, b, c, and e are given by the following Equation 8.

$$(a, b, c, d) =$$ [Equation 8]

$$\begin{cases} (\hat{d}, \hat{d}, -\hat{d}, -\hat{d}) \text{ if } (\hat{l}, \hat{m}) = (-1, -1), (0, 0), (1, 1) \\ (\hat{d}-1, \hat{d}, -\hat{d}, 1-\hat{d}) \text{ if } (\hat{l}, \hat{m}) = (-1, -1), (0, 1) \\ (\hat{d}-1, \hat{d}-1, 1-\hat{d}, 1-\hat{d}) \text{ if } (\hat{l}, \hat{m}) = (-1, 1) \\ (\hat{d}, \hat{d}+1, -1-\hat{d}, -\hat{d}) \text{ if } (\hat{l}, \hat{m}) = (0, -1), (1, 0) \\ (\hat{d}+1, \hat{d}+1, -1-\hat{d}, -1-\hat{d}) \text{ if } (\hat{l}, \hat{m}) = (1, -1) \end{cases}$$

Here, $\hat{d}$ represents an edge direction. Further operations for $\hat{m}$ and $\hat{l}$ purpose to estimate an edge direction with sub-pixel precision. Therefore, it is possible to estimate an edge direction with sub-pixel precision with reference to $\hat{m}$ and $\hat{l}$.

The following describes motion estimation in accordance with the present invention.

Figure 3:
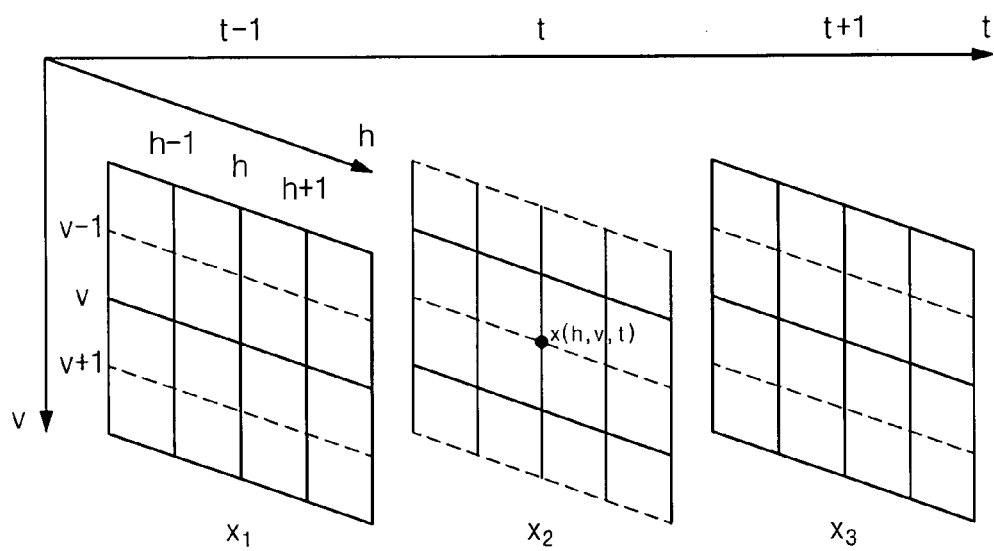
FIG. 3 illustrates the features of previous, current, and the next fields along a time lapse.

FIG. 3 illustrates the features of previous field (at time t−1), current field (at time t), and the next field (at time t+1) along a time lapse. A resultant frame of GMC is obtained from three frames $x_1$, $x_2$, and $x_3$. The accuracy of motion compensation performed depends upon the accuracy of motion estimation. For the accurate motion compensation, this embodiment of the invention performs divisional operations of motion estimation, 10 and 15 of FIG. 1, with integer (whole pixel) and sub-pixel resolution.

The motion estimation with integer resolution at step 10 of FIG. 1, is carried out for motion variation between frames $x_1$ and $x_3$, which have parities, by means of a block matching algorithm (BMA). However, since applying the BMA to the whole image is very inefficient in hardware, a motion vector is obtained by a median filter after estimating the motion vector in the unit of small block, in order to enhance operation speed.

Figure 4:
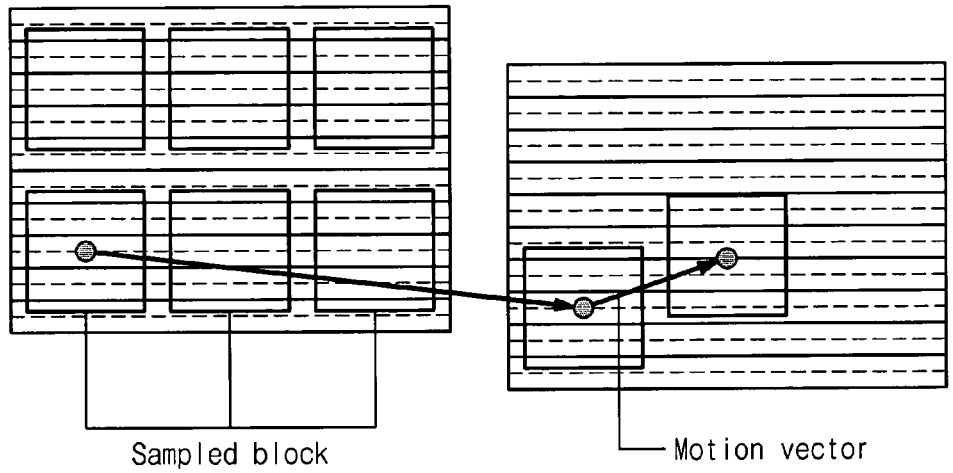
FIG. 4 briefly illustrates a procedure of motion estimation in the unit of integer.

FIG. 4 briefly illustrates a procedure of motion estimation with integer resolution. Equation 9 provides $x_{1\_I}$ and $x_{3\_I}$ that are motion compensated the phase of a current frame $x_2$ with integer resolution motion vectors $h_1$ and $v_1$.

$$x_{1\_I}(h,v) = x_1\left(h - \frac{h_I}{2}, v - \frac{v_I}{2}\right) \quad \text{[Equation 9]}$$
$$x_{3\_I}(h,v) = x_3\left(h + \frac{h_I}{2}, v + \frac{v_I}{2}\right)$$

The shifting step 11 of FIG. 1 is a process for moving and overlapping the previous frame $x_1$ and the next frame $x_3$ toward the current frame $x_2$. Subsequently, step 12 calculates a difference between the overlapped previous and next fields in frames, $x_1$ and $x_3$. Then, if the difference between the previous field (in $x_1$) and the next field (in frame $x_3$) is smaller than a threshold value th1, an interpolation is carried out with reference to a value resulting from the integer-resolution motion estimation (step 14). If, to the contrary, the difference between the previous field (in frame $x_1$) and the next field (in frame $x_3$) is larger than the threshold value th1, the sub-pixel-resolution motion estimation is carried out (step 15).

The sub-pixel resolution motion estimation of step 15 does not need an interpolation, which makes it possible to use an optical flow equation (OFE) method that is operable with a smaller burden in hardware. When the intensity of light is constant in an image with motion, Equation 10 may be provided therein.

$$\frac{dX_C(h,v,t)}{dt} = 0 \quad \text{[Equation 10]}$$

The parameters of Equation 10 are rewritten as Equation 11.

$$\frac{\partial X_C(h,v,t)}{\partial h}v_{h(h,v,t)} + \frac{\partial X_C(h,v,t)}{\partial v}v_{v(h,v,t)} + \frac{\partial X_C(h,v,t)}{\partial t} = 0 \quad \text{[Equation 11]}$$

Here, $$v_h(h,v,t) = \frac{dh}{dt} \text{ and } v_v(h,v,t) = \frac{dv}{dt},$$

represent motion velocities along directions h and v. An error function of OFE in the assemblage of pixels is defined as Equation 12.

$$E = \sum_{h,v \in B}\left(\frac{\partial X_C(h,v,t)}{\partial h}v_h(h,v,t) + \right. \quad \text{[Equation 12]}$$
$$\left.\frac{\partial X_C(h,v,t)}{\partial v}v_v(h,v,t) + \frac{\partial X_C(h,v,t)}{\partial t}\right)$$

The error function E is converted into Equation 13 by differential calculus with the parameters $v_h$ (h,v,t) and $v_v$ (h,v,t) in order to minimize the error.

$$\sum_{h,v \in B}\left(\frac{\partial X_C(h,v,t)}{\partial h}\hat{v}_h(h,v,t) + \frac{\partial X_C(h,v,t)}{\partial v}\hat{v}_v(h,v,t) + \frac{\partial X_C(h,v,t)}{\partial t}\right)\frac{\partial X_C(h,v,t)}{\partial h} = 0 \quad \text{[Equation 13]}$$
$$\sum_{h,v \in B}\left(\frac{\partial X_C(h,v,t)}{\partial h}\hat{v}_h(h,v,t) + \frac{\partial X_C(h,v,t)}{\partial v}\hat{v}_v(h,v,t) + \frac{\partial X_C(h,v,t)}{\partial t}\right)\frac{\partial X_C(h,v,t)}{\partial v} = 0$$

In Equation 14, Equation 13 is rewritten in matrix form $$\begin{bmatrix}\hat{v}_h(h,v,t)\\\hat{v}_v(h,v,t)\end{bmatrix} = \begin{bmatrix}\sum_{h,v \in B}\frac{\partial X_C(h,v,t)}{\partial h}\frac{\partial X_C(h,v,t)}{\partial v} & \sum_{h,v \in B}\frac{\partial X_C(h,v,t)}{\partial h}\frac{\partial X_C(h,v,t)}{\partial v}\\\sum_{h,v \in B}\frac{\partial X_C(h,v,t)}{\partial h}\frac{\partial X_C(h,v,t)}{\partial v} & \sum_{h,v \in B}\frac{\partial X_C(h,v,t)}{\partial v}\frac{\partial X_C(h,v,t)}{\partial v}\end{bmatrix}^{-1}\begin{bmatrix}-\sum_{h,v \in B}\frac{\partial X_C(h,v,t)}{\partial h}\frac{\partial X_C(h,v,t)}{\partial t}\\-\sum_{h,v \in B}\frac{\partial X_C(h,v,t)}{\partial v}\frac{\partial X_C(h,v,t)}{\partial t}\end{bmatrix} \quad \text{[Equation 14]}$$

In Equation 14, a sub-pixel resolution motion can be easily obtained by multiplying with an inverse matrix of the matrix of size 2×2.

A sub-pixel resolution motion vector of the i'th field is obtained by the OFE method operating between $x_2$ and $x_{1\_I}$. During this, if sub-pixel resolution motions estimated for the i'th field are defined as $\Delta h_i$ and $\Delta v_i$, a result of GMC, $x_{2\_GMC}$, is given by Equation 15.

$$x_{2\_GMC}(h,v) = x_{1\_I}(h,v) \times w_1 + x_2(h,v) \times w_2 + x_{3\_I}(h,v) \times w_3 \quad \text{[Equation 15]}$$

And, each weight value is defined with Equation 16.

$$u_i = \frac{k_i}{\sum k_i} \text{ for } i = 1, 2, 3 \quad \text{[Equation 16]}$$

Here, k is given by Equation 17.

$$k_i = \frac{1}{\sqrt{(\Delta h_i)^2 + (\Delta v_i)^2}} \text{ for } i = 1, 2, 3 \quad \text{[Equation 17]}$$

Figure 5:
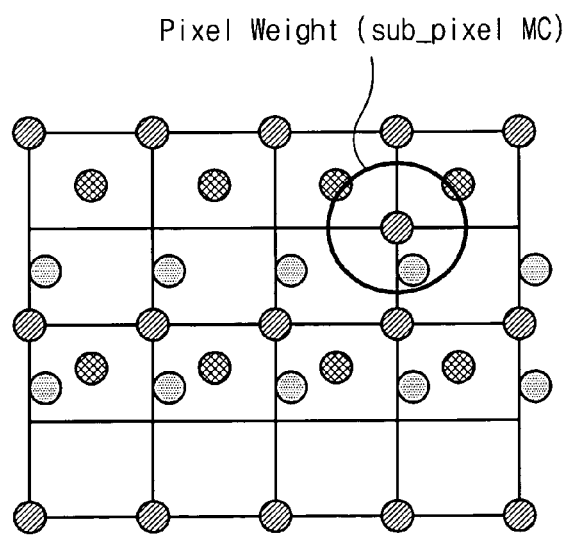
FIG. 5 illustrates a procedure for creating a sheet of frame from estimated motion information and plural fields.

FIG. 5 illustrates a procedure for creating a sheet of frame from estimated motion information and plural fields.

Now will be described the process for determining weight values in motion compensation and spatial interpolation in the hybrid interpolation method.

FIGS. 6A through 6F illustrate the features of vertical high-frequency (VHF) energy of GMC increasing relative to VHF energy of EDI when there is an error during motion estimation and compensation. FIGS. 6A through 6C show fields, which include a moving object, at the time points of t−1, t, and t+1, respectively. FIG. 6D shows a result of EDI, while FIG. 6E shows a result of GMC. FIG. 6F shows a resultant pattern after completing the sequential scanning process by means of GMC.

As illustrated in FIGS. 6A through 6F, when there is an error during the operations of ME and MC, the vertical high-frequency energy of GMC increases larger than the VHF energy of EDI. This embodiment provides a method of interpolating image data by mixing the EDI and GMC in a ratio with reference to such characteristics.

First, the spatial interpolation (SI) is carried out in step 17 (of FIG. 1) and the motion compensation (MC) is carried out in step 16. Then, after completing calculations with a horizontal differential value H_SI (step 18) and a vertical differential value V_SI (step 20), for the result of the spatial interpolation at the step 17, a horizontal differential value H_MC (step 19) and a vertical differential value V_MC (step 21), for the result of the motion compensation (step 16), are obtained.

FIGS. 7A and 7B illustrate a vertical differential filter and a horizontal differential filter, respectively. Obtained with the differential filters shown in FIGS. 7A and 7B, are a difference between the horizontal differential values, D_H and a difference between the vertical differential values, D_V, for the spatial interpolation and motion compensation, from the resultant horizontal and vertical differential values (steps 22 and 23 of FIG. 1). The difference values D_H and D_V are given by Equation 18.

$$D\_H = \begin{bmatrix} 1 & \text{if}|H\_MC| > th_{HF} \text{ and } |H\_SI| < th_{HF} \\ 0 & \text{otherwise} \end{bmatrix} \quad \text{[Equation 18]}$$

$$D\_V = \begin{bmatrix} 1 & \text{if}|V\_MC| > th_{HF} \text{ and } |V\_SI| < th_{HF} \\ 0 & \text{otherwise} \end{bmatrix}$$

Here, the parameter $th_{HF}$ is a threshold value to define the high frequency energy.

During a procedure of generating weight values, a block of dimensions Bh×Bv is used for eliminating noises of the difference values D_H and D_V. Further considerations in obtaining the weight values are as follows:

(i) As a block integrated with high-value D_V is a field having an error of MC, it is proper to conduct the spatial interpolation therein;

(ii) It is preferred to operate the spatial interpolation (SI) for a field having low density of high-value D_V and D_H; and (iii) It is preferred to operate the motion compensation (MC) for a field having high density of high-value D_V and D_H in similar.

Next, the density of differences between the horizontal and vertical differential values, D_H and D_V, are obtained for the spatial interpolation and motion compensation. At this time, assuming that $C_{VD}$ and $C_{HD}$ are the numbers of pixels in each block when D_H=1 and D_V=1, an addition-weight value Wa and a multiplication-weight value Wm are given by Equation 19 (step 24).

if $((C_{VD} - C_{HD}) >$ block 50) [Equation 19]

$$\{W_a(h, v, t) = w_{ah}, W_m(h, v, t) = w_{mh}\}$$

else if $(C_{VD} >$ block 50)

$$\{W_a(h, v, t) = w_{ah}, W_m(h, v, t) = w_{mh}\}$$

else if $((C_{VD} <$ block 20) and $(C_{HD} <$ block 20))

$$\{W_a(h, v, t) = w_{a1}, W_m(h, v, t) = w_{m1}\}$$

else if $\{W_a(h, v, t) = w_{am}, W_m(h, v, t) = w_{mm}\}$

Here, block50 and block20 represents 50% and 20%, respectively, of the number of pixels in a block. The weight values are related as $w_{ah} > w_{am} > w_{al}$ and $w_{mh} > w_{mm} > w_{ml}$. The spatial interpolation becomes greater in proportion operationally as the addition and multiplication weight values are larger, while the motion compensation becomes greater in proportion operationally as the weight values are smaller. Equation 20 provides a weighted difference-value WD(h,v,t) between the spatial interpolation and the motion compensation, in which the weight values of the pixel x(h,v,t) are reflected (step 25 of FIG. 1).

$$WD(h,v,t) = Wa(h,v,t) + Wm(h,v,t) \times |X_{SI}(h,s,t) - X_{MC}(h,v,t)| \quad \text{[Equation 20]}$$

If the weighted difference-value WD(h,v,t) is smaller than the second threshold value th2 (step 26), the value of an interpolated pixel, x(h,v,t), is set to the result of the motion compensation, i.e., a value by GMC (step 27). If the weighted difference value WD(h,v,t) is not less than the second threshold value th2 (step 26) and is higher than the third threshold value th3 (step 28), then the interpolated pixel value, x(h,v,t), is set to a result of the spatial interpolation, i.e., a value by EDI (step 29).

If the difference value WD(h,v,t) is not larger than the third threshold value th3, then the value x(h,v,t) of the interpolated pixel is newly established (step 30). Equation 21 is provides the interpolated pixel value x(h,v t) in compliance with the relation among the weighted difference-value WD(h,v,t) including the weight values, the second threshold value th2, and the third threshold value th3.

if $WD(h, v, t) < th2\{x(h, v, t) = X_{MC}(h, v, t)$ [Equation 21]

else if $(WD(h, v, t) > th3\{x(h, v, t) = X_{SI}(h, s, t)\}$ else $\{x(h, v, t) = a \times X_{SI}(h, v, t) + (1 - a) \times X_{MC}(h, v, t)\}$ Here, a is given by Equation 22.

$$a = \frac{(\text{weighted\_difference} - Th2)}{(Th3 - Th2)} \quad \text{[Equation 22]}$$

The aforementioned interpolation process is further described as follows in conjunction with FIG. 1.

First, the integer-resolution motion estimation is carried out with the previous field (t−1) and the next field (t+1) (step 10). The previous field (t−1) and the next field (t+1) are shifted to be located at the same phase of the current field (t) by means of the motion vector (step 12). If a difference between the shifted previous and next fields is near to 0 (i.e., less than the first threshold value th1) (steps 12 and 13), it is regarded as an absence of a motion and a field insertion is performed by inserting an average of the previous and next fields into the current field (step 14).

For a field where a difference between the shifted previous field and next field is larger, the motion estimation (ME) is carried out with sub-pixel precision with three fields of the previous field, current field, and the next field (step 15). Then, the motion compensation is carried out (step 16). On the other hand, the current field (at time t) is sequentially scanned by means of the edge interpolation (EDI).

The horizontal and vertical differential values H_SI, V_SI, H_MC, and V_MC are obtained from the results of the motion compensation (MC) and the spatial interpolation (EDI) (steps 18, 19, 29, 21).

In order to compare the horizontal and vertical patterns with each other, the difference D_H between H_SI and H_MC is calculated (step 22), and the difference D_V between V_SI and V_MC is calculated (step 23).

The weight values Wa and Wm are obtained from the difference D_H (between H_SI and H_MC) and the difference D_V (between V_SI and V_MC) in step 24. The difference WD reflecting the weight values is generated in step 25. The current field (at time t) is interpolated in accordance with the relation among the weight-reflected difference-value WD, the second threshold value th2, and the third threshold value th3.

In the case that there is an error during the motion estimation and compensation, the vertical high-frequency (VHF) energy of GMC increases larger than that of EDI. With this characteristics for the VHF energy, the embodiment of the present invention selects the result of the spatial interpolation (SI) as an interpolated value of the current field (t) when the VHF energy of GMC is larger than that of SI; while the embodiment of the present invention selects the result of the motion compensation (MC) as an interpolated value of the current field (t) when the VHF energy of GMC is smaller than that of SI. Otherwise, if the VHF energy of GMC is similar to that of SI, an interpolated value of the current field (t) becomes a value mixed with results of GMC and SI by the weight values.

Accordingly the present invention is able to reduce erroneous patterns in motion estimation by correctly detecting motion errors from comparing horizontal and vertical high-frequency components even while there is an error during the motion estimation. Therefore, it enhances the performance of the sequential scanning function.

Although the present invention has been described in connection with the preferred embodiments of the present invention illustrated in the accompanying drawings, it is not limited thereto. It will be understood to those skilled in the art that various substitution, modifications and changes may be thereto without departing from the scope and spirit of the invention. It is to be understood that the invention defined by the appended claims is not to be limited by particular details set forth in the above description of exemplary embodiments as many apparent variations thereof are possible without departing from the spirit or scope of the invention as hereafter claimed.

What is claimed is:

1. A method of sequentially scanning image data, the method comprising the steps of:
    performing a spatial interpolation on image data;
    performing a motion compensation on the image data;
    comparing a first vertical energy of a result of the motion compensation that is higher than a first threshold frequency with a second vertical energy of a result of the spatial interpolation that is higher than a second threshold frequency; and
    selecting one of the result of the motion compensation, the result of the spatial interpolation, and a weighted combination of the result of the motion compensation and the result of the spatial interpolation based on the comparison,
    wherein the method is performed by a computer processor.

2. The method according to claim 1, wherein the step of selecting comprises:
    selecting the result of the spatial interpolation as an interpolated value of the current pixel if the first vertical energy is higher than the second vertical energy.

3. The method according to claim 1, wherein the step of comparing comprises: calculating a weighted difference value from a horizontal differential value and a vertical differential value for each of the result of motion compensation and the result of spatial interpolation,
    wherein each of the horizontal differential value and the vertical differential value reflects a difference between the results of the motion compensation and the spatial interpolation.

4. The method according to claim 3, wherein the step of selecting comprises:
    if the weighted difference value is higher than a first threshold value, then selecting the result of the spatial interpolation as the interpolated value of the current pixel.

5. The method according to claim 3, wherein calculating the weighted difference value comprises:
    calculating horizontal and vertical differential values for the result of the motion compensation;
    calculating horizontal and vertical differential values for the result of the spatial interpolation;
    obtaining a first number of pixels in a pixel block, in which the absolute value of the horizontal differential value for the result of the motion compensation is larger than a predetermined high-frequency threshold value and the absolute value of the horizontal differential value for the result of the spatial interpolation is smaller than the predetermined high-frequency threshold value;
    obtaining a second number of pixels in a pixel block, in which the absolute value of the vertical differential value for the result of the motion compensation is larger than the high-frequency threshold value and an absolute value of the vertical differential value for the result of the spatial interpolation is smaller than the high-frequency threshold value; and
    calculating the weighted difference value from the first and second numbers of pixels.

6. The method according to claim 3, wherein the weighted difference value includes an addition-weight value and a multiplication-weight value.

7. The method according to claim 6, wherein the weighted difference value is given by an equation being: the addition-weight value plus (the multiplication-weight value times the absolute value of the difference between the results of the motion compensation and spatial interpolation).

8. The method according to claim 3, further comprising selecting the result of the motion compensation as the value of an interpolated pixel, if the weighted difference value is lower than a second threshold value.

9. The method according to claim 1, wherein the step of selecting comprises selecting a weighted combination of the result of the spatial interpolation and the result of the motion compensation as the value of an interpolated pixel.

10. The method according to claim 9, wherein the weighted combination is obtained by adding: (the result of the spatial interpolation multiplied by a second weight value) plus (the result of the motion compensation multiplied by the result of subtracting the second weight value from one).

11. The method according to claim 10, wherein the second weight value is: (a weighted difference value minus a second threshold value) divided by (a first threshold value minus the second threshold value).

12. The method of claim 1, wherein the spatial interpolation is edge-dependent spatial interpolation.

13. A method of sequentially scanning image data, the method comprising the steps of:
performing a first motion estimation on image data to generate motion vectors indicating motion between a previous field and a next fields;
performing a motion compensation, using the motion vectors, to motion compensate the previous and the next fields;
selecting an average value of pixels of the previous field and pixels of the next field to interpolate the current field if the difference between the motion compensated previous and next fields is lower than a first threshold value,
wherein the method is performed by a computer processor.

14. The method according to claim 12, wherein the difference between the motion compensated previous and next fields is obtained as the sum of absolute differences between a plurality of corresponding pixels in each of the motion compensated previous and next fields.

15. The method according to claim 12, further comprising:
performing a second motion compensation having sub-pixel precision with the previous, current, and next fields if the difference between the motion compensated previous and next fields is equal to or higher than a first threshold value.

16. The method according to claim 15, wherein the said difference between the motion compensated previous and next fields is obtained as the sum of absolute differences between a plurality of corresponding pixels in each of the motion compensated previous and next fields.

17. The method according to claim 12, further comprising:
performing a spatial interpolation for the current field;
calculating a horizontal differential value and a vertical differential value for each of the result of the motion compensation and the result of the spatial interpolation;
calculating a weighted difference value from the calculated horizontal and vertical differential values.

18. The method according to claim 17, further comprising:
comparing the weighted difference value to a second threshold value and if the weighted difference value is higher than the second threshold value, then selecting the result of the spatial interpolation.

19. A method of sequentially scanning image data, the method comprising the steps of:
performing a first interpolation on image data;
performing a second interpolation on the image data;
comparing a first vertical energy of a result of the first interpolation that is higher than a first threshold frequency with a second vertical energy of the result of second interpolation that is higher that a second threshold frequency; and
selecting one of the result of the first interpolation, the result of the second, interpolation and a weighted combination of the result of the first interpolation and the result of the second interpolation based on the comparison,
wherein the step of comparing comprises: calculating a weighted difference value from a horizontal differential value and a vertical differential value for each of the result of the first interpolation and the result of the second interpolation, and
wherein the method is performed by a computer processor.

20. The method according to claim 19, wherein the step of selecting comprises:
selecting the result of the first interpolation as an interpolated value of the current pixel if the first vertical energy is higher than the second energy.

21. The method according to claim 19, wherein the first interpolation includes performing a spatial interpolation and wherein the second interpolation includes performing a motion compensation.

* * * * *